(12) United States Patent
Hoffmeister et al.

(10) Patent No.: US 10,611,467 B2
(45) Date of Patent: Apr. 7, 2020

(54) METHOD FOR PRODUCING A SMOOTH AERODYNAMIC SURFACE OF AN AIRCRAFT COMPONENT

(71) Applicant: Airbus Operations GmbH, Hamburg (DE)

(72) Inventors: Thomas Hoffmeister, Hamburg (DE); Joachim Piepenbrock, Hamburg (DE); Alexander Engels, Hamburg (DE)

(73) Assignee: Airbus Operations GmbH (DE)

( * ) Notice: Subject to any disclaimer, the term of this patent is extended or adjusted under 35 U.S.C. 154(b) by 149 days.

(21) Appl. No.: 15/814,928

(22) Filed: Nov. 16, 2017

(65) Prior Publication Data

US 2018/0155012 A1    Jun. 7, 2018

(30) Foreign Application Priority Data

Nov. 22, 2016  (DE) .................. 10 2016 122 446

(51) Int. Cl.
| | | |
|---|---|---|
| *B64C 21/10* | (2006.01) | |
| *F16B 33/00* | (2006.01) | |
| *B05D 5/02* | (2006.01) | |
| *B05D 3/12* | (2006.01) | |
| *B29C 73/04* | (2006.01) | |
| *B29C 37/00* | (2006.01) | |
| *B29C 73/02* | (2006.01) | |
| *B64C 1/00* | (2006.01) | |
| *C09K 3/10* | (2006.01) | |
| *B05D 7/00* | (2006.01) | |

(52) U.S. Cl.
CPC ................ *B64C 21/10* (2013.01); *B05D 3/12* (2013.01); *B05D 5/02* (2013.01); *B29C 37/005* (2013.01); *B29C 73/02* (2013.01); *B29C 73/04* (2013.01); *B64C 1/00* (2013.01); *F16B 33/004* (2013.01); *B05D 7/5483* (2013.01); *B64C 2001/0072* (2013.01); *C09K 3/1012* (2013.01)

(58) Field of Classification Search
CPC ... B29C 37/005; B29C 37/0032; B29C 70/64; B29C 73/00; B29C 73/02; B29C 73/04; B29C 73/06; B29C 39/44; B29C 41/48; B29C 43/54
USPC ....................................................... 156/48, 60
See application file for complete search history.

(56) References Cited

U.S. PATENT DOCUMENTS

| | | | |
|---|---|---|---|
| 2006/0198980 A1* | 9/2006 | Westerdahl | B29C 73/10 428/63 |
| 2013/0037655 A1* | 2/2013 | Bradley | B64C 3/26 244/124 |

FOREIGN PATENT DOCUMENTS

| | | | | |
|---|---|---|---|---|
| DE | 10 2016 202 161 A1 | 8/2016 | | |
| JP | 01152049 A | * | 6/1989 | ............. B29C 70/74 |
| WO | 2007/036349 A1 | 4/2007 | | |

* cited by examiner

*Primary Examiner* — Michael N Orlando
*Assistant Examiner* — Abhishek A Patwardhan
(74) *Attorney, Agent, or Firm* — Lerner, David, Littenberg, Krumholz & Mentlik, LLP

(57) ABSTRACT

A method for producing a smooth aerodynamic surface of an aircraft component is depicted and described. The method includes: provision of an aircraft component with an aerodynamic surface, which has an uneven section, introduction of a liquid or viscous, uncured sealing compound into the uneven section, introduction of a solid, precured sealing body into the uneven section in such a way that the sealing body presses into the sealing compound until the sealing compound at least partially surrounds the sealing body, curing of the sealing compound.

9 Claims, 4 Drawing Sheets

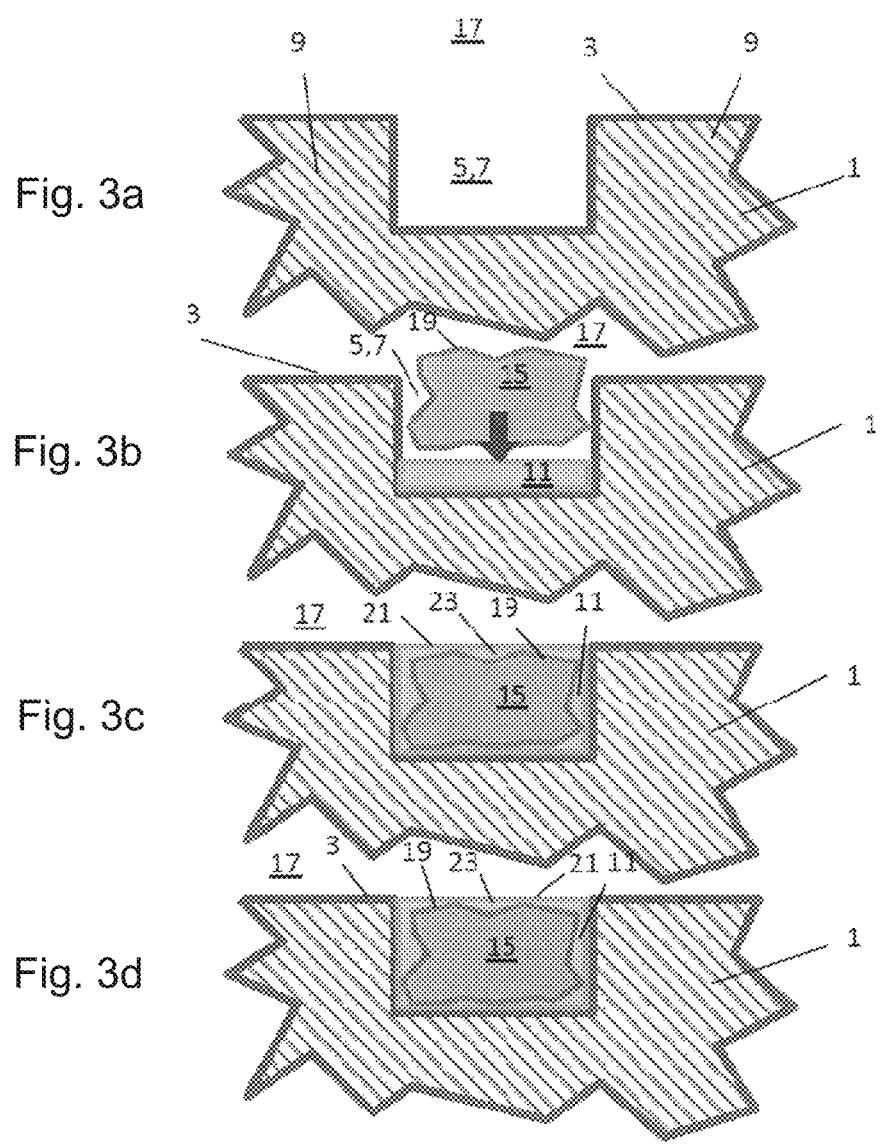

METHOD FOR PRODUCING A SMOOTH AERODYNAMIC SURFACE OF AN AIRCRAFT COMPONENT

FIELD OF THE INVENTION

The present invention relates to a method for producing a smooth, preferably laminar, aerodynamic surface of an aircraft component.

An aerodynamic surface refers to an outer surface of the aircraft component, which the aerodynamic air stream of the aircraft component contacts when an aircraft is in flight. For example, it may be the outer surface of the outer skin of a wing or of a fuselage of an aircraft or a helicopter. A laminar surface refers to a surface which is formed in such a way that, in particular is smooth in such a way that, the flow that contacts it is laminar. A laminar air stream on aerodynamic surfaces in particular has the advantage that minimal resistance is produced. The method according to the invention therefore serves to produce an aircraft component that generates minimal resistance when the aircraft is in flight.

BACKGROUND OF THE INVENTION

For the purpose of smoothing the aerodynamic surfaces of aircraft components, it is known from the prior art to fill the gaps present in the aerodynamic surfaces, in particular between two skin elements that abut one another, with a liquid or viscous, uncured sealing compound and to then cure same. However, the problem arises that, subsequent to curing of the sealing compound, a reworking of the sealed gap is often required. There are two reasons for this: Firstly, the sealing compound is relatively difficult to manipulate and therefore difficult to introduce into the gap, so that a smooth finish of the gap is often not immediately achievable. Secondly, the sealing compound sinks to a not inconsiderable extent when it is cured, i.e. it shrinks, so that for this reason also a smooth finish of the gap is often not immediately achievable and reworking is required. Such reworking of the seal of the gap involves an additional work step, which entails extra costs and time.

BRIEF SUMMARY OF THE INVENTION

For these reasons, the problem addressed by aspects of the present invention is to provide a more efficient method for producing a smooth aerodynamic surface of an aircraft component.

In one example, this problem is solved by means of a method comprising the following steps:

Firstly, an aircraft component, for example a wing part or a fuselage part is provided with an aerodynamic surface. This aerodynamic surface has a local uneven section, for example, a gap or a step between two skin elements. A liquid or viscous, uncured sealing compound is then introduced into the uneven section, with the uneven section preferably not being entirely filled with the sealing compound. Subsequently or simultaneously, a solid, precured sealing body is introduced into the uneven section, so that the sealing body presses into the sealing compound until the sealing compound surrounds the sealing body at least partially, preferably entirely, in other words, until at least a portion of the surface of the sealing body facing the environment is covered with sealing compound, which forms the new, smoothed aerodynamic surface of the aircraft component. Finally, the sealing compound is cured together with the sealing body in the uneven section, while a temperature or pressure exposure can be realized if appropriate.

In order to smooth or seal the uneven section, the method according to an aspect of the invention thus uses a precured sealing body, which is combined with the uncured sealing compound. In this way, a large proportion of the uneven section volume to be filled is already filled by the precured sealing body, so that only a minimal amount of uncured sealing compound is required to uniformly enclose the sealing body in the uneven section on all sides and to close the uneven section in a gapless manner and to provide a surface which can be modelled, and which is smooth and oriented towards the environment.

This quantity of uncured sealing compound which is reduced to a minimum on the one hand makes the effect of the sinking or shrinking of the sealing compound during the curing very minimal relative to the total volume of the uneven section, because the largest part of the volume of the uneven section is taken up by the sealing body. On the other hand, the influence of an imprecise dispensing of the uncured sealing compound is likewise very minimal because only a very small total amount of sealing compound is required.

The method according to an aspect of the invention thus makes it possible to realize a more precise sealing and smoothing of the uneven section in a first work step, so that a costly reworking in a second work step is unnecessary. A particularly efficient method for the production of a smooth aerodynamic surface of an aircraft component is thus provided.

In this method, the precuring of the sealing body can take place locally in a suitable form. However, it is preferred that the sealing body is provided locally in an already precured form, for example as piece goods. If appropriate, the form of the precured sealing body can also be adapted locally.

In one preferred embodiment, the sealing body and the sealing compound are formed from the same material, preferably from polysulfide with hollow spheres. In this way, the uncured sealing compound can, as it cures, combine particularly well with the precured sealing body and form a common homogeneous seal of the uneven section. Furthermore, certification of an additional material is not necessary.

In another preferred embodiment, the uneven section is formed lengthwise in the form of an aerodynamic joint between two skin elements of the aircraft component that abut one another. Such an aerodynamic joint can for example be a gap or a step. The uneven section is preferably formed in the form of a gap between two skin elements that abut one another in the manner of a butt joint. Alternatively, it can also be preferred that the uneven section is formed in the form of a step between two overlapping skin elements. Such gaps or steps are often unavoidable at the transition between two skin elements of the aircraft component that abut one another and form an interruption of the otherwise smooth surface of the aircraft component, which prevents a laminar air stream and increases the aerodynamic resistance. It therefore makes sense to seal such gaps or steps, in other words, to eliminate an interruption of the otherwise smooth aerodynamic surface. Another possibility is an uneven section, in particular a gap, between a skin element and a window, which needs to be smoothed over.

According to another preferred embodiment, an extension of the aerodynamic surface of the aircraft component on both sides beside the uneven section and beyond the uneven section defines an contour line, with the form and the volume of the sealing body being adapted such that the sealing body, once it has been fully introduced into the uneven section, lies entirely below the contour line. The contour line thus constitutes an extension of the surface of the aircraft component on both sides beside the uneven section and beyond the uneven section such that a particularly smooth surface or target surface is obtained after the smoothing, i.e. in particular there are no more edges. The sealing body introduced into the uneven section is located entirely below the contour line in order that the contour itself can be formed by the moldable sealing compound which, above the sealing body, seals the uneven section relative to the environment via the sealing body.

It is particularly preferred that the volume of the sealing body is between 50% and 98%, preferably between 70% and 95%, and more preferably between 80% and 90% of the volume of the uneven section, measured between the aircraft component and the contour line. With such a volume ratio, a maximally large proportion of the uneven section can be filled merely by the precured sealing body, while at the same time there is still enough space available in the uneven section for uncured sealing compound to completely surround the sealing body.

In another preferred embodiment, the form and the volume of the sealing body and the quantity of the introduced sealing compound are adapted such that the sealing body, when introduced into the uneven section, presses into the sealing compound to such an extent that said sealing compound projects beyond the sealing body at the sides and, in the fully introduced state of the sealing body, fully covers the sealing body relative to the environment with a final layer of the sealing compound. The volume ratio of the sealing body to the sealing compound is preferably between 3:1 and 6:1, and is preferably ca. 4:1. In this way, a maximally large sealing body is fully surrounded by sealing compound in the uneven section, so that the uneven section is filled in a gapless manner and the final layer can be formed relative to the environment according to the contour line.

It is particularly preferred that, after the introduction of the sealing body into the uneven section and the pressing in of the sealing compound and formation of the final layer, the final layer is adapted to the contour line relative to the environment, preferably with a spatula. In this way, the liquid or viscous sealing compound can be easily adapted to the contour line and a particularly flat surface can be achieved at the location of the uneven section relative to the environment.

In another preferred embodiment, the sealing compound and the sealing body are introduced into the uneven section together. The sealing compound is initially applied to the sealing body, preferably in such a way that the entire surface of the sealing body is covered with sealing compound. The sealing body with the sealing compound adhering thereto is then introduced into the uneven section.

BRIEF DESCRIPTION OF THE DRAWINGS

An exemplary embodiment of the present invention is explained in greater detail below with the aid of drawings, in which FIGS. 3a-3d shows a schematic step-by-step depiction of an exemplary embodiment of the method according to an aspect of the invention for the production of a smooth aerodynamic surface of an aircraft component and FIGS. 4-6 shows three different forms of an uneven section in the aerodynamic surface of an aircraft component, which were smoothed with the method according to FIGS. 3a-3d.

DETAILED DESCRIPTION

Figure 1:
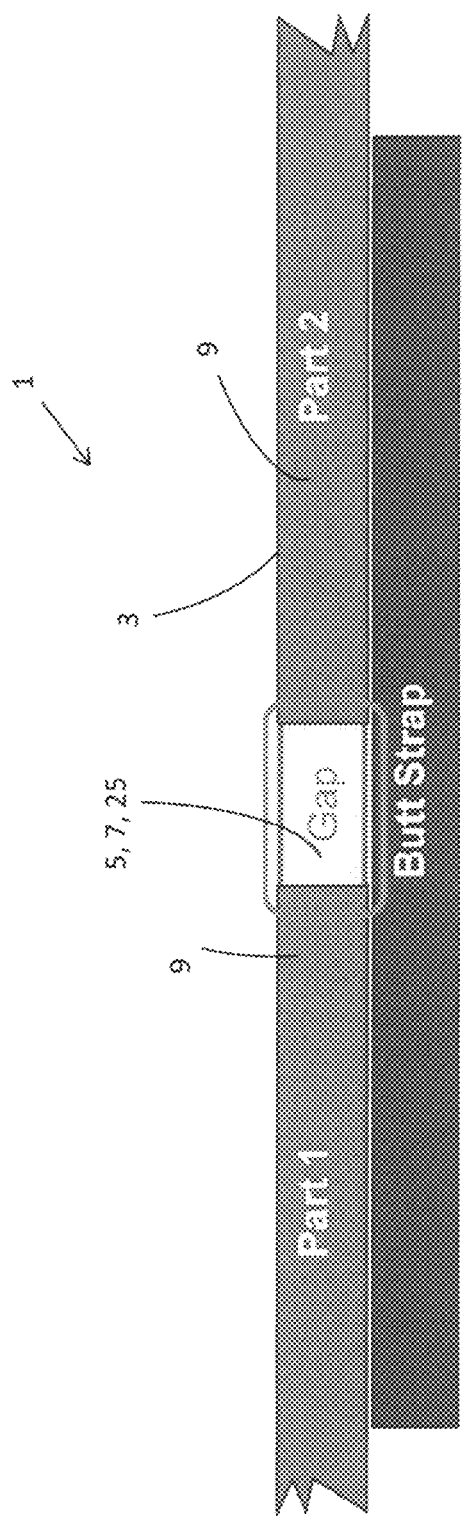
FIG. 1 shows a schematic depiction of an aircraft component with an aerodynamic surface in which there is an uneven section, which is smoothed with the method according to the invention.
Figure 2A:
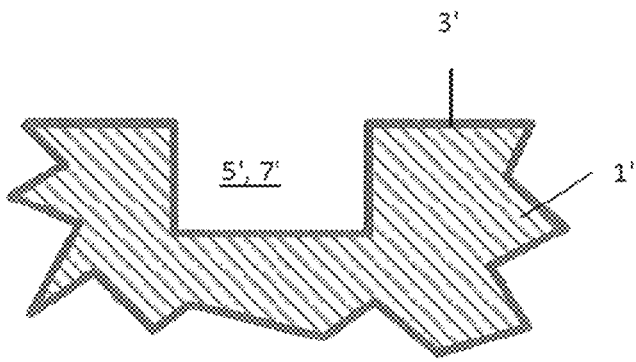
FIGS. 2a-2e show a schematic step-by-step depiction of a method known from the prior art for the production of a smooth aerodynamic surface of an aircraft component.
Figure 2B:
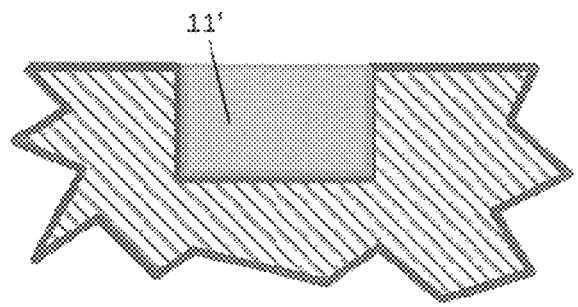
Figure 2C:
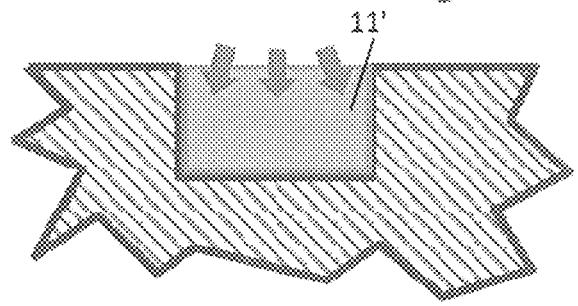
Figure 2D:
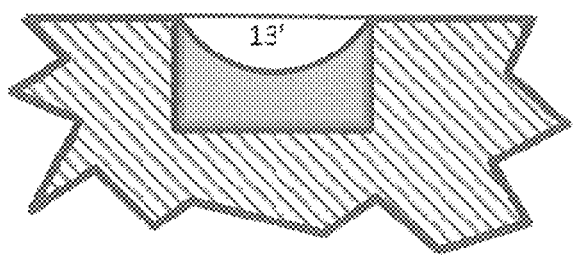
Figure 2E:
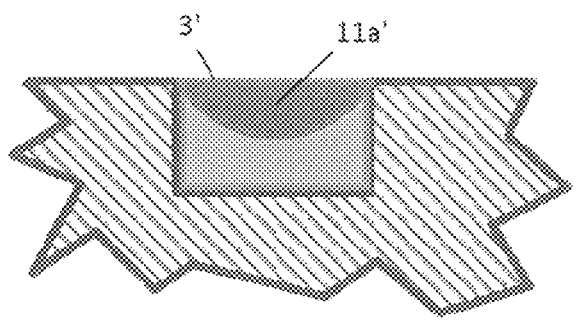

FIG. 1 depicts an aircraft component 1, in the present case a portion of a fuselage or of a wing of an aircraft, which has an aerodynamic surface 3, in which there is an uneven section 5 in the form of a gap 7 between two skin elements 9 that abut one another in the manner of a butt joint.

As depicted in FIGS. 2a-2e, in accordance with the prior art for the production of a smooth aerodynamic surface 3' of the aircraft component 1', i.e. for the smoothing of the uneven section 5' or sealing of the gap 7', an uncured sealing compound 11' is introduced into the uneven section 5' in a manner flush with the aerodynamic surface 3', and is then cured. Due to curing the sealing compound 11' sinks, i.e. its volume is reduced so that reworking must occur in a subsequent step, in that additional sealing compound 11a' must be applied and cured in order to compensate for the sinkage 13' and to obtain a smooth aerodynamic surface 3'.

FIGS. 3a-3d by contrast depicts the method according to an aspect of the invention for producing a smooth aerodynamic surface 3. According to this method, an aircraft component 1 with an aerodynamic surface 3 is firstly provided, which has an uneven section 5 in the form of a gap 7. The gap 7 is formed between two skin elements 9 of the aircraft component 1 that abut one another in the manner of a butt joint, as is also depicted in FIG. 1.

A liquid or viscous, uncured sealing compound 11 is then introduced into the uneven section 5, with the uneven section 5 not being fully filled however, but instead only being filled up to a predetermined content with sealing compound 11. A solid, precured sealing body 15 is then introduced into the uneven section 5 in such a way that the sealing body 15 presses into the sealing compound 11, until the sealing compound 11 surrounds the sealing body 15, so that the surface 19 of the sealing body 15 facing the environment 17 is covered with sealing compound 11. The sealing body 15 and the sealing compounds 11 are formed from the same material, namely from polysulfide with hollow spheres.

The form and the volume of the sealing body 15 is thus adapted such that the sealing body 15, once it has been fully introduced into the uneven section 5, lies entirely below a contour line 21, which is defined as an extension of the aerodynamic surface 3 of the aircraft component 1 on both sides beside the uneven section 5 and beyond the uneven section 5. Furthermore, the form and the volume of the sealing body 15 and the quantity of the introduced sealing compound 11 is adapted such that the sealing body 15, when introduced into the uneven section 5, presses in the sealing compound 11 to such an extent that said sealing compound flows part or projects beyond the sealing body 15 at the sides and, in the fully introduced state of the sealing body 15, fully covers the sealing body 15 relative to the environment 17 with a final layer 23 of sealing compound 11. The volume of the sealing body 15 is between 80% and 90% of the volume of the uneven section 5 between the aircraft component 1 and the contour line 21.

The final layer 23 of the sealing compound 11 above the sealing body 15 is then adapted to the contour line 21 relative to the environment 17 with the aid of a spatula. The sealing compound 11 is then cured together with the sealing body 15 in the uneven section 5, so that a smooth aerodynamic surface 3 of the aircraft component 1 is created.

Figure 4:
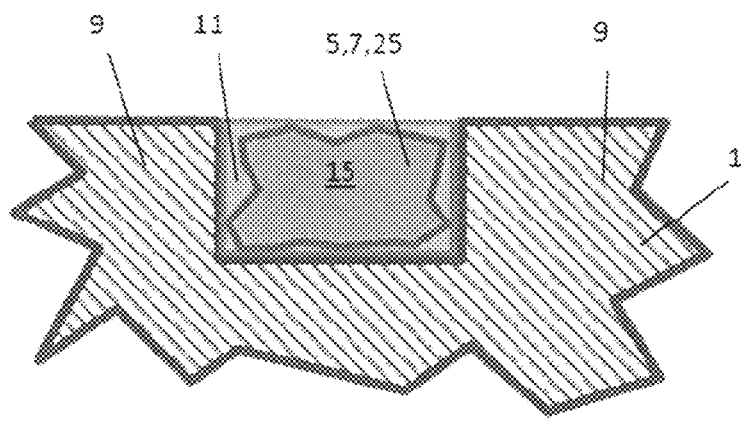
Figure 5:
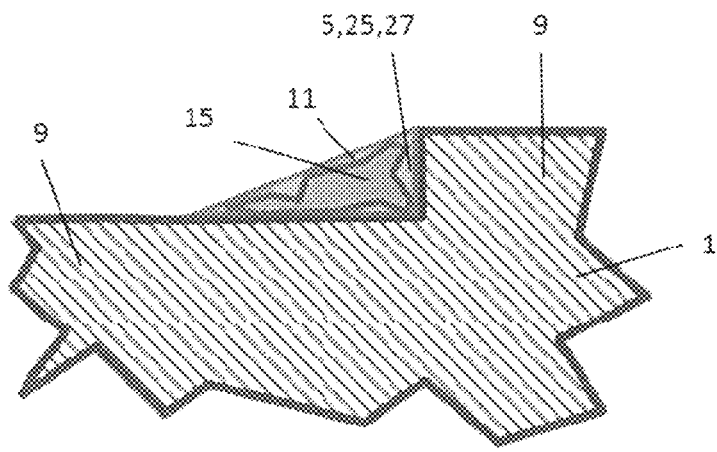
Figure 6:
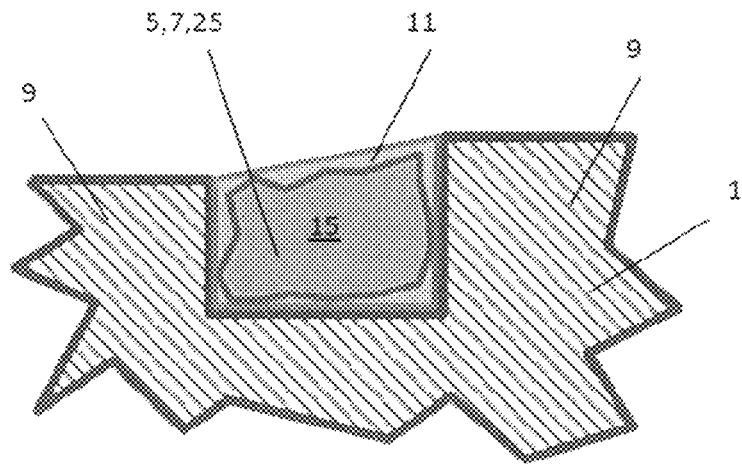

FIGS. 4 to 6 depict three alternatives of possible uneven sections 5 in the aerodynamic surface 3 of an aircraft component 1, which are smoothed with the method described previously and depicted in FIG. 3. All three uneven sections 5 extend lengthwise in the form of an aerodynamic joint 25 between two skin elements 9 that abut one another. FIG. 4 depicts an uneven section 5, which is formed in the form of a gap 7 between two skin elements 9 that abut one another in the manner of a butt joint. FIG. 5 depicts an uneven section 5, which is formed in the form of a step 27 between two overlapping skin elements 9. FIG. 6 depicts, in a manner similar to FIG. 4, an uneven section 5 in the form of a gap 7 between two skin elements 9 that abut one another in the manner of a butt joint, but with a height difference existing between both skin elements 9, which is also compensated for by the smoothing.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a smooth aerodynamic surface of an aircraft component, comprising:
providing an aircraft component having an aerodynamic surface with an uneven section;
introducing a liquid or viscous, uncured sealing compound into the uneven section;
introducing a solid, precured sealing body into the uneven section in such a way that the sealing body presses into the sealing compound until the sealing compound at least partially surrounds the sealing body and a surface of the sealing body facing an environment of the uneven section is covered with the uncured sealing compound; and
curing the sealing compound.

2. The method according to claim 1, wherein the sealing body and the sealing compound are formed from the same material.

3. The method according to claim 1, wherein the uneven section is formed lengthwise in the form of an aerodynamic joint between two skin elements that abut one another.

4. The method according to claim 1, wherein the uneven section is formed in the form of a gap between two skin elements that abut one another in the manner of a butt joint, or
wherein the uneven section is formed in the form of a step between two overlapping skin elements.

5. The method according to claim 1, wherein an extension of the aerodynamic surface of the aircraft component on both sides beside the uneven section and beyond the uneven section defines a contour line, and
wherein the form and the volume of the sealing body are adapted such that the sealing body, once the sealing body has been fully introduced into the uneven section, lies entirely below the contour line.

6. The method according to claim 5, wherein the volume of the sealing body is between 50% and 98% of the volume of the uneven section between the aircraft component and the contour line.

7. The method according to claim 5, wherein the form and the volume of the sealing body and the quantity of the introduced sealing compound are adapted such that the sealing body, when introduced into the uneven section, presses into the sealing compound to such an extent that said sealing compound projects beyond the sealing body at the sides and, in the fully introduced state of the sealing body, fully covers the sealing body relative to the environment with a final layer of the sealing compound.

8. The method according to claim 7, wherein the final layer is adapted to the contour line relative to the environment.

9. The method according to claim 1, wherein the sealing compound and the sealing body are introduced into the uneven section together, in that the sealing compound is firstly applied to the sealing body and the sealing body with the sealing compound adhering thereto is then introduced into the uneven section.

* * * * *